(12) United States Patent
Katayama

(10) Patent No.: US 6,599,494 B2
(45) Date of Patent: Jul. 29, 2003

(54) PROCESS FOR PREPARING ARTIFICIAL ZEOLITE BY A SLURRY REACTION METHOD

(75) Inventor: Yukuo Katayama, Tokyo (JP)

(73) Assignee: K.E.M. Corporation, Tokyo (JP)

(*) Notice: Subject to any disclaimer, the term of this patent is extended or adjusted under 35 U.S.C. 154(b) by 0 days.

(21) Appl. No.: 10/104,338

(22) Filed: Mar. 21, 2002

(65) Prior Publication Data

US 2002/0106322 A1 Aug. 8, 2002

Related U.S. Application Data

(63) Continuation-in-part of application No. 09/377,394, filed on Aug. 19, 1999, now abandoned.

(51) Int. Cl.$^7$ ............................................... C01B 39/02
(52) U.S. Cl. ........................................ 423/700; 423/712
(58) Field of Search ................................. 423/700, 712

(56) References Cited

U.S. PATENT DOCUMENTS

| 4,661,291 A | 4/1987 | Yamasaki et al. |
| 4,798,709 A | 1/1989 | Lakshmanan et al. |
| 5,296,208 A | * 3/1994 | Lesch |

FOREIGN PATENT DOCUMENTS

| EP | 451 112 | 9/1991 |
| JP | 56149313 | 11/1981 |
| JP | 64-024014 | 1/1989 |
| JP | 02221114 | 9/1990 |
| JP | 02229709 | 9/1990 |
| JP | 05009018 | 1/1993 |
| JP | 05155611 | 6/1993 |
| JP | 05221628 | 8/1993 |
| JP | 09-315814 | 12/1997 |
| JP | 11236212 | 8/1999 |
| WO | 98/26101 | 6/1998 |

OTHER PUBLICATIONS

Helmut Holler and Ulrike Wirsching Graz, "Zeolit information from fly ash" Fortschr. Miner. 63(1) 21–43, 1985.

* cited by examiner

*Primary Examiner*—David Sample
(74) *Attorney, Agent, or Firm*—Pitney, Hardin, Kipp & Szuch, LLP

(57) ABSTRACT

A process is provided for the preparation of artificial zeolite comprising the steps of (a) mixing x kilograms of incineration ash or any other aluminosilicate-containing substance with y liters of an aqueous solution of alkali metalhydroxide having a concentration of 1 N or higher in a proportion, y/x, of from about 0.1 to about 1.5 (liter/kg) to prepare a slurry, and (b) heating the slurry to cause a zeolite forming reaction. Water is continuously or intermittently removed by evaporation so that a decrease in a concentration of alkali which would otherwise naturally occur during the reaction is at least suppressed to thereby facilitate the reaction.

6 Claims, 3 Drawing Sheets

PROCESS FOR PREPARING ARTIFICIAL ZEOLITE BY A SLURRY REACTION METHOD

CROSS-REFERENCE TO RELATED APPLICATION

This application is a continuation-in-part of U.S. patent application Ser. No. 09/377,394, filed Aug. 19, 1999 now abandoned.

FIELD OF THE INVENTION

The invention relates to a process for the preparation of zeolite from incineration ash such as flyash and other aluminosilicate-containing substances.

DESCRIPTION OF THE PRIOR ART

As zeolite, which is crystalline aluminosilicate, naturally occurring zeolites are known, such as mordenite and clinoptilolite. Synthetic zeolites such as A zeolite and Y zeolite prepared from sodium silicate and sodium aluminate are used as a catalyst, molecular sieve and the like.

Meanwhile, it is also known to prepare zeolite by heating a slurry of flyash and an aqueous solution of alkali at 60° C., 70° C., 80° C., 90° C. or 100° C. for several hours. This zeolite is generally called artificial zeolite. The artificial zeolite has similar ion exchange ability and adsorption ability as natural zeolite and synthetic zeolite do. However, its composition, crystalline structure, and purity are not precisely controlled, compared to those of synthetic zeolite. Meanwhile, the artificial zeolite is cheaper and suitable to mass consumption applications, for example, a soil improvement material and a deodorant. However, it should be much cheaper for broader applications, and thus an improvement on the process for its preparation is required.

In a conventional method where a mixture of 2.2 liters of an aqueous solution of alkali per kg of flyash is heated to 100° C., it takes 5 hours (Japanese Patent Application Laid-open 6-321525). The present inventor found that it takes 20 hours to achieve a conversion of 50%.

Moreover, the reaction mixture obtained after the reaction contains a lot of by-produced water glass besides zeolite, and, consequently, the reaction mixture is sticky, which requires a high cost for solid (zeolite)-liquid separation. Further, the separated zeolite is still sticky and requires a lot of water and time to wash with water.

PURPOSE OF THE INVENTION

The present invention provides a process for preparing high quality artificial zeolite, preferably, at a conversion to zeolite above 50% in a short reaction time, where solid-liquid separation is made easier or unnecessary by reducing the amount of by-produced water glass (soluble silicate), and wasteful consumption of sodium hydroxide, potassium hydroxide and the like is decreased.

SUMMARY OF THE INVENTION

Conventionally, a concentration of alkali in an aqueous phase of a reaction system decreases with the progress of the reaction. The present inventor has now found that when the decrease in the concentration of alkali is at least suppressed or, preferably, avoided by evaporating water to remove from the reaction system during the reaction, the by-production of water glass is suppressed to make the reaction mixture non-sticky and, therefore, solid-liquid separation is easier or most of the water in the reaction system can be evaporated by the end of the reaction. In any case, there is no difficulty inherent to the conventional method in removing liquid from the reaction mixture. Further, the supplied alkali is used more effectively for the reaction.

Further, although it has been considered that even if the reaction temperature is raised above 100° C., there are not attained sufficient advantages, e.g., an increase in crystallinity to counterbalance the cost (Japanese Patent Application Laid-Open 6-321525, paragraph 0041), the present inventor has now found that in the process according to the present invention, a higher conversion can be achieved in a shorter time by applying a reaction temperature above 100° C., preferably above about 125° C., and the amount of alkali metal hydroxide such as sodium hydroxide is smaller, and therefore the amount of water to be used is smaller, which is advantageous in heat efficiency.

The present invention is a process for preparing artificial zeolite comprising the steps of:

(a) mixing x kilograms of incineration ash or any other aluminosilicate-containing substance with y liters of an aqueous solution of alkali metal hydroxide having a concentration of 1 N or higher in a proportion, y/x, of 0.1 to 1.5 (liter/kg) to prepare a slurry; and (b) heating the slurry from step (a) to cause a zeolite-forming reaction wherein water is continuously or intermittently removed by evaporation so that a decrease in a concentration of alkali which would otherwise naturally occur with a progress of the reaction is at least suppressed to thereby facilitate the reaction.

Also, the present invention includes the process, wherein the heating takes place at a temperature of higher than 100° C. and at most 350° C. A preferred range is from at least about 100° C. to about 350° C., and preferably the reaction takes place in a closed system such as an autoclave.

DESCRIPTION OF THE PREFERRED EMBODIMENTS

The present invention will be explained by reference to FIG. 1, but is not restricted by it.

Figure 1:
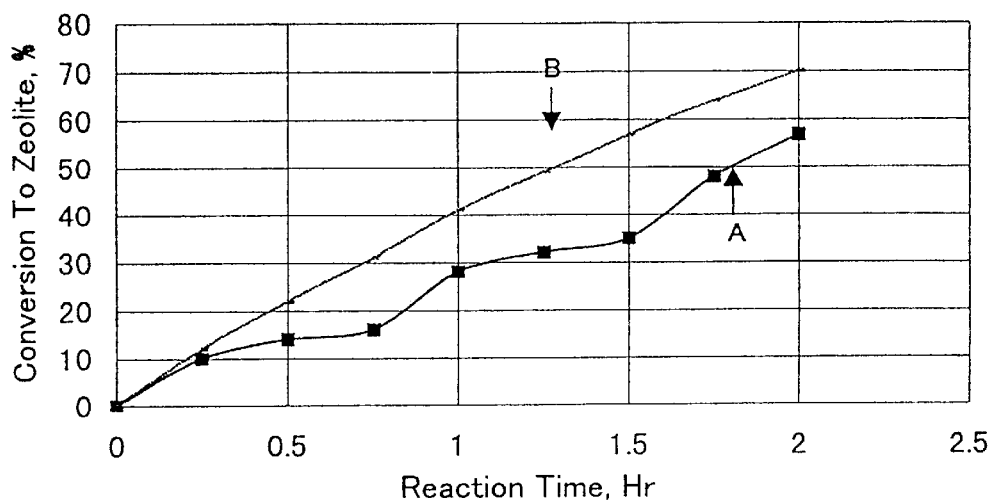
FIG. 1 is a graph showing a relationship between a reaction time and a conversion.

FIG. 1 shows the results of experiments made by using a pressurized agitation autoclave. Flyash and an aqueous 3.5 Normal (N) sodium hydroxide solution were fed in a proportion of 2 kg/1 liter and heated to 150° C. The abscissa indicates a reaction time and the ordinate indicates a conversion to zeolite. The conversion was measured by X-ray fluorescence spectroscopy.

According to the present invention, at a time of 45 minutes after start of the heating, an aliquot of water corresponding to 10 wt. % of the fed flyash was removed by evaporation from a valve at an upper part of the autoclave (curve A). The conversion before the water removal was around 15%, and its increase was extremely small. However, the conversion increased suddenly after the water removal.

The conversion exceeded 30% at a time of 1.5 hours, but its increase tended to become small. Water was continuously removed from that time to a time of 2 hours. Then, the conversion increased suddenly again to reach 57%.

If the water removal according to the present invention is not carried out, the conversion stays at about 20% even at a time of 2 hours. To attain a higher conversion by a conventional method, an amount of sodium hydroxide to be fed may be made larger to reduce a decrease in a concentration of sodium hydroxide. Generally, use of an aqueous solution of sodium hydroxide having a concentration of 4N or larger is avoided in fear of corrosion of the apparatus, and consequently the feed amount of the aqueous solution of sodium hydroxide is inevitably increased. Curve B in FIG. 1 shows an extreme example of that case. That is, when as large as 10 liters of an aqueous 3.5N sodium hydroxide solution per kg of flyash is used, which amount is 20 times the amount used in Curve A, a conversion as high as more than 50% can be attained in 1.5 hours. However, this results not only in a low production amount per volume of a reactor, but also in high costs for heating and after-treatment of the large amount of the aqueous solution, which is not practical. In Japanese Patent Application Laid-Open 6-321525, 2.2 liters of an aqueous 2N sodium hydroxide solution is used per kg of flyash, while in the present invention, the amount of an aqueous sodium hydroxide solution is as small as 1.5 liters or less, and still an extremely high conversion is achieved which can not be attained by the conventional method.

A reaction mixture produced in the method of the present invention is preferably not in a slurry state but in a solid state. The reaction mixture obtained in the conventional method is sticky due to a by-produced water glass (soluble silicate) and contains a lot of water. Accordingly, it is difficult to separate the liquid. The invention described in Japanese Patent Application Laid-Open 6-321525 is to solve this problem by separating and purifying an excess amount of an aqueous solution of alkali and product crystals with a liquid separation apparatus after lowering the temperature of the slurry to 70° C. or lower. In the present invention, a liquid separation process is preferably no longer used.

The obtained reaction mixture is preferably subjected to a washing process to remove the residual alkali metal hydroxide. There are no difficulties in washing and liquid separation unlike in the conventional methods. For washing, an aqueous solution of calcium chloride or a diluted hydrochloric acid solution is preferred.

The incineration ash as a raw material includes residues after incinerating coal, active sludge, paper sludge, garbage and the like, among which flyash is preferred. The aluminosilicate-containing substances other than the incineration ash include naturally occurring minerals such as analcite, muscovite, feldspar, and volcanic ash.

Figure 2:
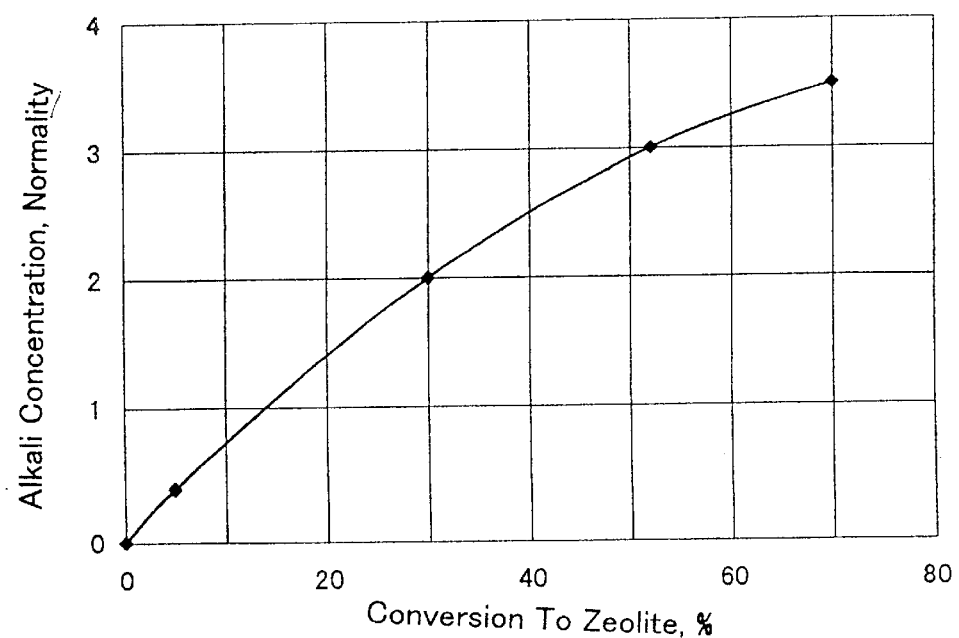
FIG. 2 is a graph showing a relationship between a concentration of alkali and a conversion.

The concentration of the aqueous solution of alkali hydroxide is 1N or higher, preferably 2 to 4N. If the concentration is lower than the lower limit, a reaction rate is too small to achieve a high conversion in a short time. Data supporting this are shown in FIG. 2. A so large amount as 20 liters of an aqueous solution of sodium hydroxide with a predetermined concentration per kg of flyash was fed to a pressurized agitation autoclave. Then, a decrease in the concentration of the sodium hydroxide with the progress of the reaction was small, and relation between the concentration and the conversion could be seen. The reaction was carried out at 150° C. for 2 hours. The ordinate indicates the predetermined concentration, and the abscissa indicates the attained conversion. For a conversion of 30%, a concentration of 2N is required; and for a conversion of 50%, a concentration of 3N is required. Therefore, it can be seen that, when a smaller amount of an aqueous solution of sodium hydroxide is used according to the present invention, a high conversion to zeolite can be attained by maintaining the concentration of sodium hydroxide at this level by removing water according to the present invention after the sodium hydroxide is consumed with the progress of the reaction.

As to alkali metal hydroxide, sodium hydroxide or potassium hydroxide is preferably used.

Zero point one to one point five liters, preferably 0.2 to 0.7 liters, of the aqueous solution of sodium hydroxide is mixed with each 1 kg of incineration ash or aluminosilicate-containing substance (hereinafter represented by flyash as a typical example). Usually, the amount of an aqueous sodium hydroxide solution is smaller when a concentration of the solution is higher; and it is larger when the concentration is lower.

Figure 3:
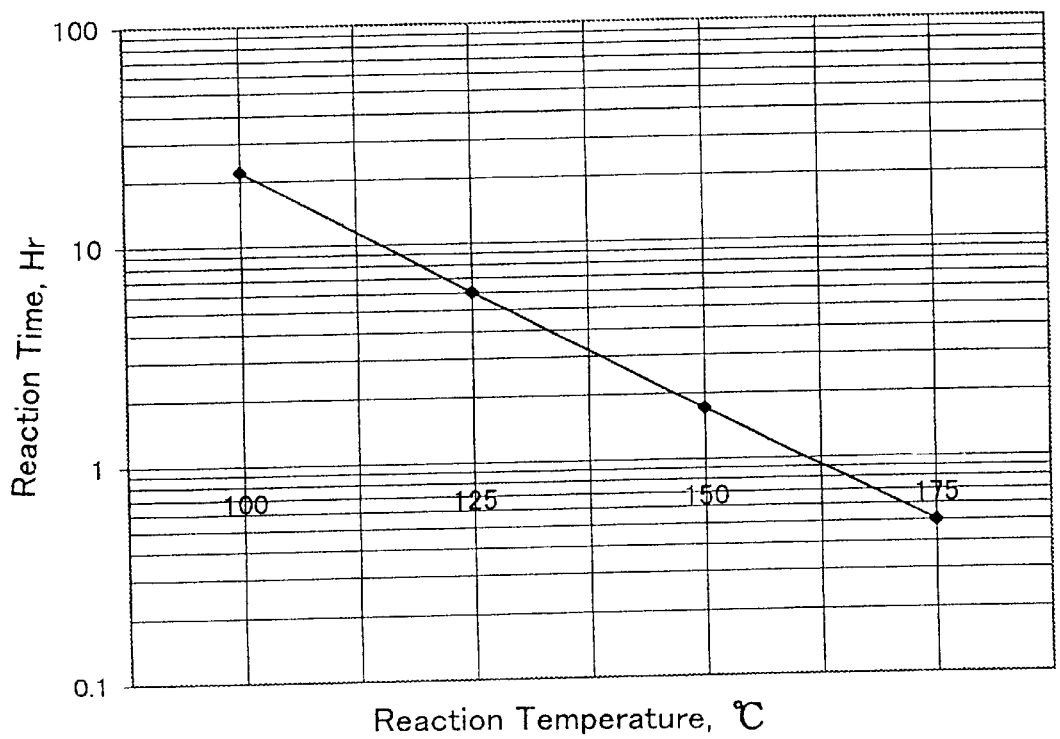
FIG. 3 is a graph showing a relationship between a reaction temperature and a reaction time.

Conventionally, the reaction took place at 100° C. or lower. However, a time needed to achieve a predetermined conversion becomes significantly shorter by setting the to reaction temperature above 100° C. FIG. 3 shows data from experiments where 10 liters of an aqueous 3.5N sodium hydroxide solution per kg of flyash was fed in a pressurized agitation autoclave, and heated at a predetermined temperature to determine a reaction time necessary to obtain a predetermined conversion (50–60%). Although the large amount of an aqueous solution of sodium hydroxide was used, it took 20 hours to achieve a so high conversion as 50% at 100° C. according to the conventional method. However, 6 hours and 1.7 hours are enough at 125° C. and 150° C., respectively. In these experiments, to make data easier to be understood, a large amount of an aqueous solution of sodium hydroxide is used and no water was removed. The same tendency is observed when the amount of the aqueous solution of sodium hydroxide is decreased and water removal is carried out. In the conventional method where a large amount of aqueous solution is used, if the reaction is carried out at a high temperature, a large amount of heat is needed, which is uneconomical. This is avoided in the present method. However, disadvantages become conspicuous in terms of required quality of materials for apparatus and heat efficiency at a temperature above 350° C.

In the above, an embodiment of a batch process for the present invention is described. In the following, an example of a continuous process will be described.

Figure 4:
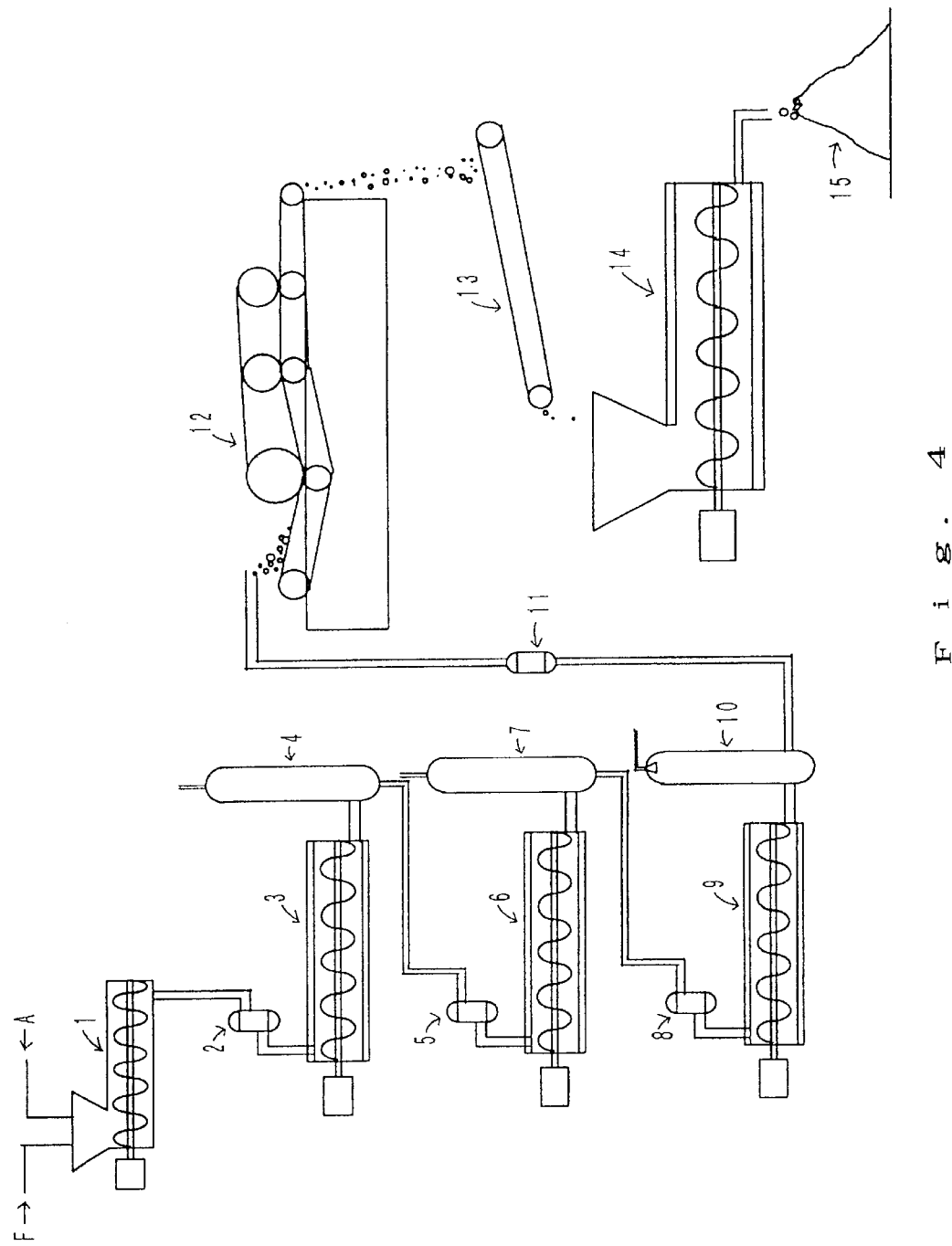
FIG. 4 is a flow diagram of a continuous production system according to the present invention.

In FIG. 4, flyash (F) is fed to a rotary-screw mixing extruder (1) at a rate of 100 kg (about 0.1 m$^3$)/hr. At the same time, an aqueous 3.5N sodium hydroxide solution (A) is fed to the mixer (1) at a rate of 50 liters/hr. A resulting slurry is fed to a pressure type screw-agitation mixing reactor (3) with a screw pump (2). The reactor (3) is provided with a jacket of a heating medium and heated to 150° C. The inner pressure of the reactor (3) is kept at 5 atm (gauge) mainly by heating. The slurry is discharged after 40-minute residence in the reactor (3), and delivered to a flash evaporator (4), where a certain amount of water is removed by evaporation, which amount corresponds to about 10 wt. % of the flyash fed at 100 kg/hr. The remaining slurry is fed to a similar type of a pressure type screw agitation-mixing reactor (6) with a screw pump (5), and treated at 150° C., 5 atm (gauge) for 40 minutes, and then about 10 kg/hr of water is evaporated in a flash evaporator (7). Then, the remaining slurry is fed to an agitation-mixing reactor (9) with a pump (8). Although the reactor (9) is heated also to 150° C., it is not closed unlike the reactors (3) and (6) and water is withdrawn gradually from an exit and midway vents. The slurry fed with a pump (8) loses most of the water during the residence of 40 mins in the reactor (9). At the exit of the reactor (9), it is not in a slurry state, but is a product zeolite in a solid and discrete form. This is fed to a washing tower (10), and washed with an aqueous solution of calcium chloride. By this washing, a small amount of unreacted sodium ions remained in the product are washed away and, at the same time, part of the sodium in the zeolite is replaced with calcium. Alternatively, sodium ions can be removed by washing with an aqueous dilute hydrochloric acid solution. The resulting slurry is delivered to a belt-press dehydrator (12) with a screw pump (11) to be compressed and dehydrated and then transferred to a drier (14) via a belt conveyer (13) to be dried and to yield a final product (15). Artificial zeolite with a conversion of 57% is obtained in the amount of 1.25 times the weight of the raw material flyash.

It should be noted that pressurization is not critical to the present invention, though the reactors (3,6) were operated at a pressure of 5 atm as described above, which pressure was caused by setting the temperature to 150° C. in the presence of water. In fact, the intended reaction to form zeolite progresses by heating at 150° C. under an atmosphere of steam without pressurization.

It is also to be understood that the following claims are intended to cover all of the generic and specific features of the invention herein described and all statements of the scope of the invention, which, as a matter of language, might be said to fall therebetween.

I claim:
1. A process for preparing artificial zeolite comprising the steps of:
   (a) mixing x kilograms of incineration ash or another aluminosilicate-containing substance with y liters of an aqueous solution of alkali metal hydroxide having a concentration of 1 N or higher in a proportion, y/x, of from about 0.1 to about 1.5 (liter/kg) to prepare a slurry; and
   (b) heating the slurry from step (a) at a temperature of at least about 125° C. in a closed system to cause a zeolite-forming reaction wherein water is continuously or intermittently removed by evaporation so that a decrease in a concentration of alkali which would otherwise naturally occur during the reaction is at least suppressed to thereby facilitate the reaction.

2. The process of claim 1, wherein the heating in step (b) takes place at a temperature of higher than about 125° C. and at most about 350° C.

3. The process of claim 1 or 2, wherein a reaction mixture obtained after the reaction is subjected to a washing process to remove alkali without being subjected to a liquid separation process.

4. The process of claim 1 or 2, wherein the reaction mixture obtained after the reaction is not a highly viscous slurry containing water glass produced by a side reaction, but is in a solid form which is easy to wash.

5. The process of claim 1 or 2, wherein the incineration ash is flyash produced by combustion of coal, active sludge, paper sludge, or garbage.

6. The process of claim 1, wherein the closed system is an autoclave.

* * * * *